US012600291B2

(12) United States Patent
Kim

(10) Patent No.: US 12,600,291 B2
(45) Date of Patent: Apr. 14, 2026

---

(54) LAMP SYSTEM WITH IMPROVED VISIBILITY

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 162 days.

(21) Appl. No.: 18/492,970

(22) Filed: Oct. 24, 2023

(65) Prior Publication Data

US 2024/0181953 A1      Jun. 6, 2024

(30) Foreign Application Priority Data

Dec. 5, 2022      (KR) ........................ 10-2022-0167507

(51) Int. Cl.
   *B60Q 1/08*      (2006.01)
   *B60Q 1/14*      (2006.01)
   *G06V 20/58*      (2022.01)
(52) U.S. Cl.
   CPC ............. *B60Q 1/085* (2013.01); *B60Q 1/143* (2013.01); *G06V 20/584* (2022.01); *B60Q 2300/054* (2013.01); *B60Q 2300/42* (2013.01)
(58) Field of Classification Search
   CPC .. B60Q 1/085; B60Q 1/143; B60Q 2300/054; B60Q 2300/42; B60Q 1/00; B60Q 1/0023; B60Q 11/005; B60Q 2300/312; B60Q 2300/314; G06V 20/584

USPC .......................................................... 315/308
See application file for complete search history.

(56) References Cited

U.S. PATENT DOCUMENTS

| | | | | |
|---|---|---|---|---|
| 9,969,326 | B2 * | 5/2018 | Ross | B60Q 5/005 |
| 11,704,910 | B2 * | 7/2023 | Endo | G06V 20/58 362/466 |
| 2008/0198372 | A1 * | 8/2008 | Pan | F21S 41/645 356/121 |
| 2017/0240096 | A1 * | 8/2017 | Ross | G05D 1/0212 |
| 2018/0297511 | A1 * | 10/2018 | Park | B60Q 1/143 |
| 2024/0166123 | A1 * | 5/2024 | Kim | B60Q 1/1407 |
| 2024/0181953 | A1 * | 6/2024 | Kim | B60Q 1/0023 |

FOREIGN PATENT DOCUMENTS

JP      WO2019159765 A1      1/2021

* cited by examiner

*Primary Examiner* — Ryan Jager
(74) *Attorney, Agent, or Firm* — NovoTechIP International PLLC

(57)      ABSTRACT

Provided is a lamp system with improved visibility, and more particularly, to a lamp system positioned on a vehicle, the system including: a first lamp module generating a low beam, and outputting the low beam to the outside of the vehicle; a second lamp module generating light of a predetermined symbol, and outputting light to the outside of the vehicle; a sensor unit including at least one of an advanced driver assistance system (ADAS) sensor or an illumination sensor, and outputting external situation information; and a control unit receiving the output of the sensor unit, and controlling brightness of the second lamp module.

11 Claims, 7 Drawing Sheets

Contrast Ratio = 300/1 = 300

Contrast Ratio = 350/200 = 1.75 ( ↓ )

WEATHER
INFORMATION

20

10

(a)

(b)

LAMP SYSTEM WITH IMPROVED VISIBILITY

CROSS-REFERENCE TO RELATED APPLICATIONS

This application claims priority under 35 U.S.C. § 119 to Korean Patent Application No. 10-2022-0167507, filed on Dec. 5, 2022, in the Korean Intellectual Property Office, the disclosure of which is incorporated herein by reference in its entirety.

TECHNICAL FIELD

The following disclosure relates to a lamp system, and more particularly, to a lamp system with improved visibility by controlling output of the lamp system based on acquired surrounding environment information.

BACKGROUND

In the recent development of an auto vehicle headlamp, the development of an intelligent headlamp with a large emphasis on safety is actively progressing around the world, and the auto vehicle headlamp has evolved along with the development of lighting technology using electricity. New types of light sources such as a sealed beam lamp utilizing a headlamp like a single filament bulb, a halogen lamp using a halogen gas, and a high-intensity discharge (HID) lamp using a high voltage discharge method have emerged one after another. A light emitting diode (LED) lamp using light emitting diodes has been spotlighted after the 21st century. Accordingly, a high-resolution LED market is gradually expanding, and an application for road image projection of a high-resolution LED is gradually expanding.

Meanwhile, as shown in FIG. 1, a road image projection lamp may have lower visibility when its surrounding illumination is high. The reason is that the road image projection lamp has limited output of the high-resolution LED, and may have lower visibility by being buried in a surrounding light source when the surrounding illumination is higher than the brightness of a road information display symbol.

RELATED ART DOCUMENT

PCT International Publication No. JPWO2019-159765 (published on Aug. 22, 2019)

SUMMARY

An embodiment of a lamp system with improved visibility according to the present disclosure is directed to providing a lamp system with increased stability and convenience by preventing visibility of road information display from being affected by surrounding illumination of the lamp system.

In one general aspect, provided is a lamp system with improved visibility which is a lamp system positioned on a vehicle, the system including: a first lamp module generating light, and outputting light to the outside of the vehicle in one direction; a second lamp module generating light of a predetermined symbol, and outputting light to the outside of the vehicle; a sensor unit including at least one of an advanced driver assistance system (ADAS) sensor or an illumination sensor, and outputting external situation information; and a control unit receiving the output of the sensor unit, and controlling brightness of the second lamp module.

The control unit may receive front image information of the vehicle from the ADAS sensor, calculate a comparison value for brightness of each pixel based on the image information, and control the brightness of the second lamp module to be increased when the comparison value is reduced by a predetermined reference or more.

The control unit may assign a larger number to a pixel having greater illumination, and calculate the comparison value by selecting two pixels having the greatest contrast between the pixels.

The control unit may receive approach information of another vehicle from the ADAS sensor, control the brightness of the second lamp module to be increased based on the approach information of another vehicle when determining that another vehicle approaches the vehicle, and control the brightness of the second lamp module to be reduced when determining that another vehicle around the vehicle disappears after a predetermined time.

The control unit may receive weather information of a region where the vehicle is positioned from a server, and control the brightness of the second lamp module based on the received weather information.

The control unit may receive illumination information of a region where the vehicle is positioned from an external server, and control the brightness of the second lamp module to be increased when the received illumination information is a predetermined reference or more.

The control unit controls the brightness of the second lamp module by adjusting a duty cycle based on a drive mode of the vehicle.

The control unit may increase the duty cycle to be above the predetermined reference when the drive mode is a first mode, lower the duty cycle to be below the predetermined reference when the drive mode is a second mode, and increase the duty cycle to be above the predetermined reference when the drive mode is a third mode.

The control unit may receive surrounding illumination information of the vehicle from the illumination sensor, and control black and white images of the symbol output by the second lamp module to be inverted and output when the illumination information is the predetermined reference or more.

The control unit may control the second lamp module for light from the second lamp module to be emitted to a region where light emitted from the lamp systems positioned on the left and right sides of the vehicle overlap each other when receiving the output of the sensor unit to determine that surrounding illumination of the vehicle is to be increased.

The system may further include a temperature detection unit detecting a temperature of at least one of the first lamp module or the second lamp module, wherein the control unit controls the brightness of the second lamp module to be increased at a predetermined temperature or more based on output of the temperature detection unit.

The temperature detection unit may detect the temperatures of the first lamp module and the second lamp module, and the control unit may compare the temperature of the first lamp module with the temperature of the second lamp module, and control the brightness of the second lamp module to be increased when the temperature of the second lamp module is higher than the temperature of the first lamp module.

DETAILED DESCRIPTION

In order to describe the present disclosure, operational advantages of the present disclosure, and objects accomplished by embodiments of the present disclosure, the embodiments of the present disclosure are hereinafter exemplified and described with reference to the accompanying drawings.

First, terms used in this application are used only to describe specific embodiments rather than limiting the present disclosure, and a term of a singular number may include its plural number unless explicitly indicated otherwise in the context. In addition, it is to be understood that a term "include", "have", or the like used in this application specifies the existence of features, numerals, steps, operations, components, parts, or combinations thereof, which are mentioned in the specification, and does not preclude the existence or addition of one or more other features, numerals, steps, operations, components, parts, or combinations thereof.

When it is decided that the detailed description of the known configuration or function related to the present disclosure may obscure the gist of the present disclosure, the detailed description thereof will be omitted.

Figure 1:
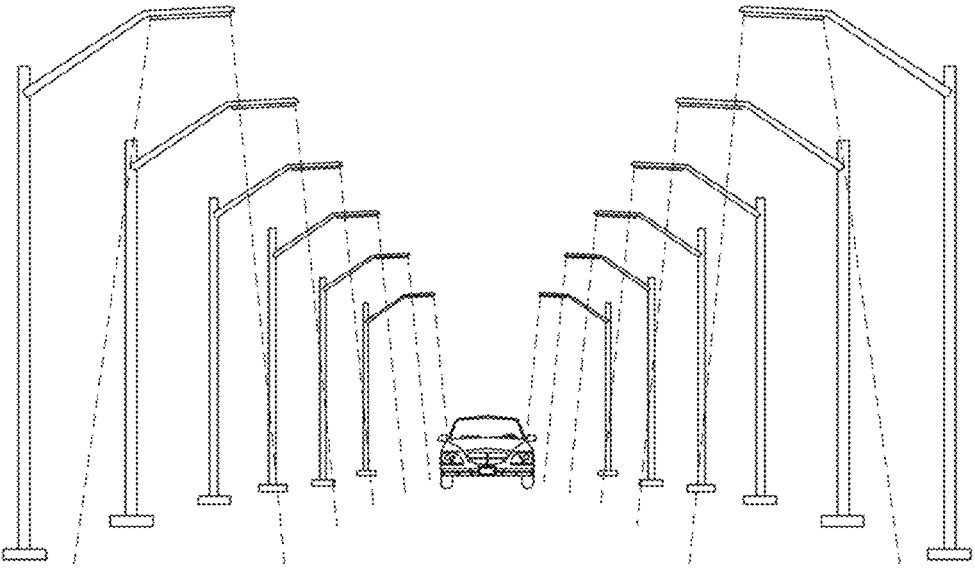
FIG. 1 shows a case where surrounding illumination of a vehicle is high.
Figure 2:
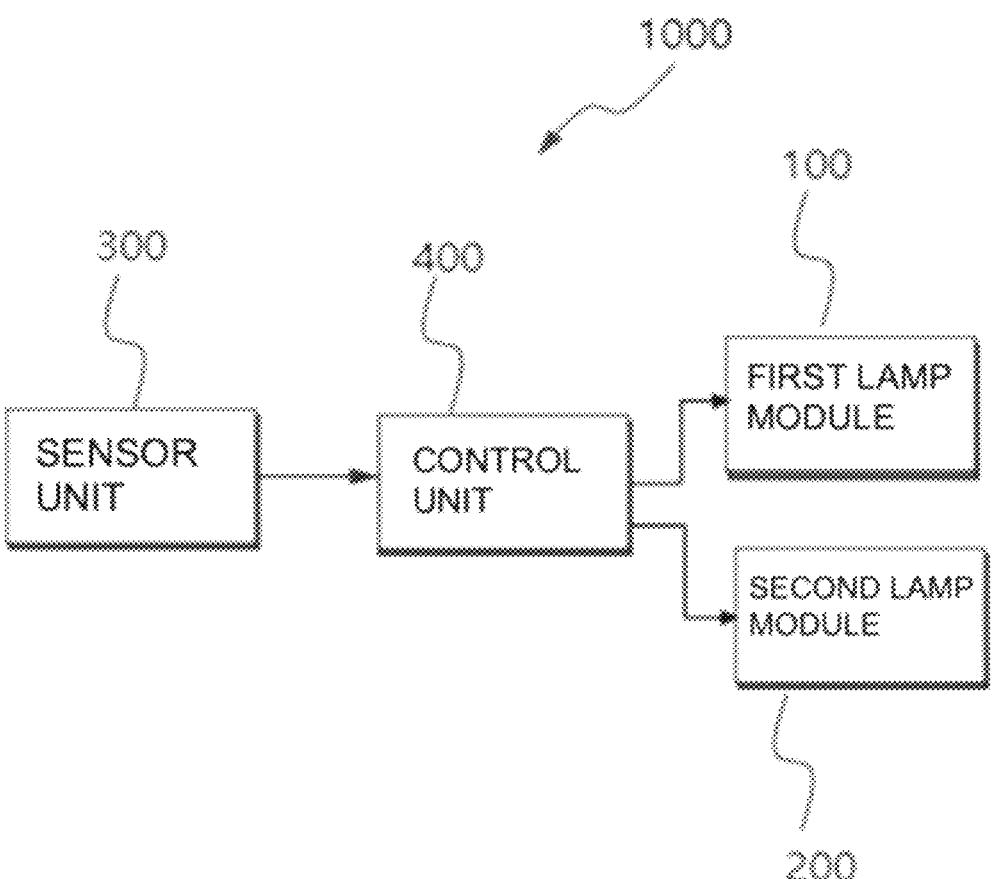
FIG. 2 is a block diagram showing a lamp system according to an embodiment of the present disclosure.

FIG. 2 is a block diagram showing a lamp system according to an embodiment of the present disclosure.

As shown in FIG. 2, a lamp system 1000 positioned on a vehicle 10 according to the present disclosure may include a first lamp module 100, a second lamp module 200, a sensor unit 300, and a control unit 400.

The first lamp module 100 may generate light, and output light to the outside of the vehicle 10 in one direction.

The second lamp module 200 may generate light of a predetermined symbol, and output light to the outside of the vehicle 10 to project the symbol onto the road where the vehicle is located.

The sensor unit 300 may include at least one of an advanced driver assistance system (ADAS) sensor or an illumination sensor, and output external situation information.

The control unit 400 may receive the output of the sensor unit 300, and control brightness of the second lamp module 200.

Here, the first lamp module 100 may generate a low beam.

In addition, the ADAS sensors may detect everything a driver may see as well as things the driver cannot or may not notice. The ADAS sensor may typically include a radar, an ultrasound, a light detection and ranging (LiDAR), and a camera.

Example 1

Figure 3A:
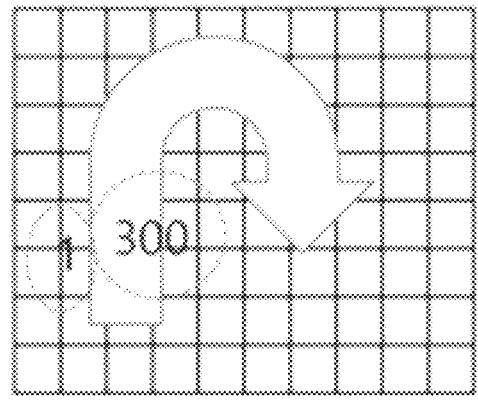
FIGS. 3A and 3B are schematic diagrams showing Example 1 of the present disclosure.
Figure 3B:
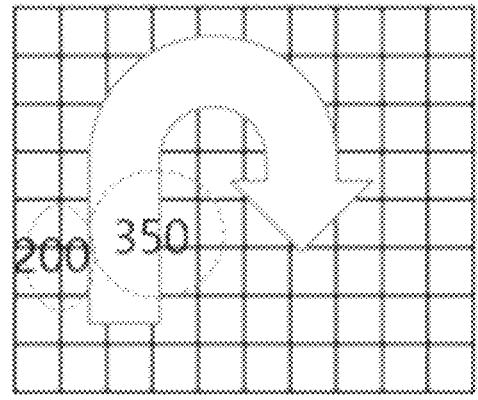

FIGS. 3A and 3B are schematic diagrams showing Example 1 of the present disclosure.

According to an embodiment of the present disclosure, the control unit 400 may receive front image information of the vehicle 10 from the ADAS sensor. In addition, the control unit 400 may calculate a comparison value for brightness of each pixel based on the front image information, and control the brightness of the second lamp module 200 to be increased when the comparison value is reduced by a predetermined reference or more. In more detail, as shown in FIG. 3, the camera included in the ADAS sensor may change the captured front image information into pixel data, and the control unit 400 may assign a larger number to pixel data having greater illumination. Accordingly, the control unit 400 may calculate the comparison value by selecting two pixels having the greatest contrast between the pixels. The comparison value may be expressed as in the following equation:

$$\text{Contrast Ratio} = \frac{\text{Luminance}_{white}}{\text{Luminance}_{black}}$$

FIG. 3A is an example of the pixel data when there is no surrounding light, and FIG. 3B is an example of the pixel data when there is surrounding light.

As shown in FIG. 3B, when the comparison value is reduced to the predetermined reference or more, the control unit 400 may determine that visibility of the symbol that is output from the second lamp module 200 is reduced due to the surrounding lighting of the vehicle 10, and increase the brightness of the second lamp module 200 by increasing a current of a light source of the second lamp module 200. Here, the control unit 400 may increase an amount of current linearly from a threshold 100.

Example 2

According to another embodiment of the present disclosure, the control unit 400 may receive approach information of another vehicle from the ADAS sensor. The control unit 400 may control the brightness of the second lamp module 200 to be increased based on the received approach information of another vehicle when determining that another vehicle approaches the vehicle 10. In addition, the control unit 400 may lower the brightness of the second lamp module 200 again when determining that another vehicle around the vehicle 10 disappears after a predetermined time after controlling the brightness of the second lamp module 200 to be increased.

Example 3

Figure 4:
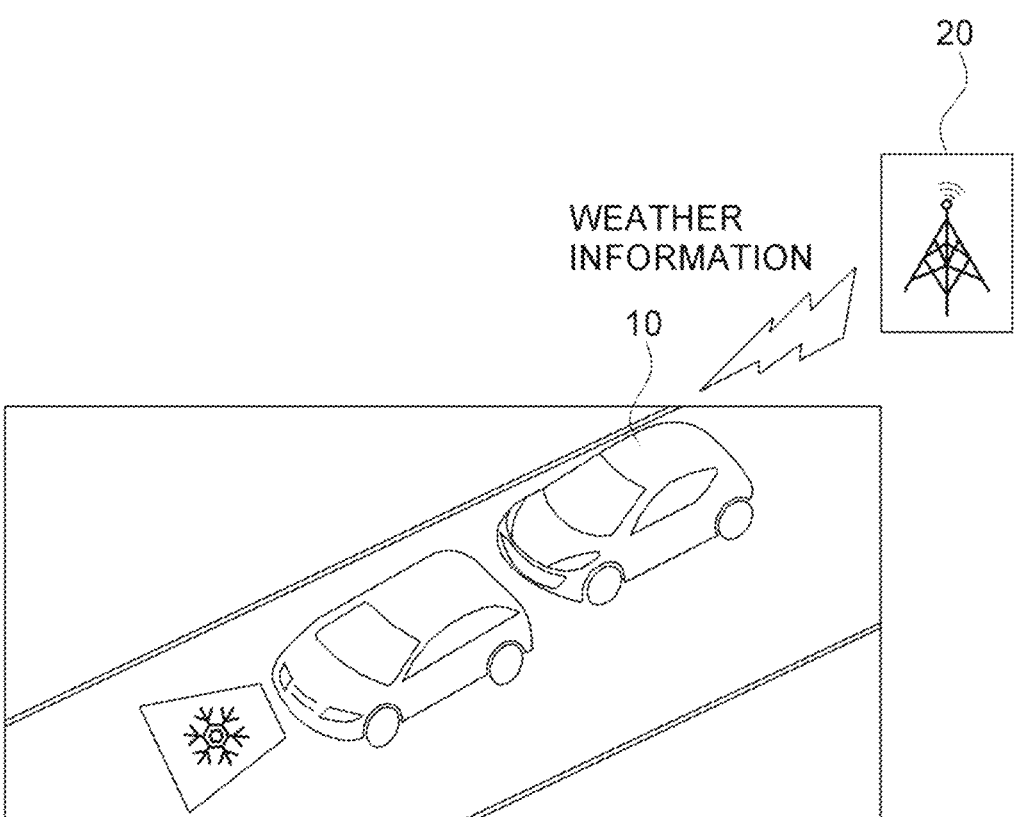
FIG. 4 is a schematic diagram showing Example 3 of the present disclosure.

FIG. 4 is a schematic diagram showing Example 3 of the present disclosure.

As shown in FIG. 4, according to another embodiment of the present disclosure, the control unit 400 may receive weather information of a region where the vehicle 10 is positioned from the server 20, and control the brightness of the second lamp module 200 based on the received weather information. The control unit 400 may receive the weather information of a road where the vehicle 10 is positioned by analyzing big data such as weather observation equipment and closed-circuit television (CCTV) images, and improve visibility of the second lamp module 200 by automatically increasing the brightness of the second lamp module 200 when determining that the weather is bad, such as snowy or rainy.

Example 4

According to another embodiment of the present disclosure, the control unit 400 may receive illumination information of a region where the vehicle 10 is positioned from a server 20. The control unit 400 may then control the brightness of the second lamp module 200 to be increased when the received illumination information is a predetermined reference or more based on the received illumination information. The control unit 400 may increase the brightness of the second lamp module 200 when the vehicle 10 is driven in an area where its surrounding illumination is expected to be high using navigation information. In more detail, the control unit 400 may need to increase the brightness of the second lamp module 200 because the visibility of the road information symbol may be poor due to the surrounding light sources in a tunnel or a downtown area.

Example 5

According to another embodiment of the present disclosure, the control unit 400 may control the brightness of the second lamp module 200 by adjusting a duty cycle based on a drive mode of the vehicle 10. The control unit 400 may control the brightness of the second lamp module 200 by predicting the surrounding illumination based on a drive mode of an adaptive front lighting system (AFLS). In detail, the AFLS is a term referring to an automatic light distribution variable headlamp system, which controls the lamp (or the headlamp) by itself for the driver to drive the vehicle 10 more safely by adjusting the brightness or emission angle of the lamp (or the headlamp) based on a driving environment of the vehicle 10. Accordingly, the control unit 400 may increase the duty cycle to be above the predetermined reference when the drive mode of the vehicle 10 is a first mode, lower the duty cycle to be below the predetermined reference when the drive mode is a second mode, and increase the duty cycle to be above the predetermined reference when the drive mode is a third mode. In more detail, the control unit 400 may increase the duty cycle because the surrounding illumination is bright in an E-Mode, which is a highway drive mode. In addition, the control unit 400 may lower the duty cycle because the surrounding illumination is dark in a C-Mode, which is a national road drive mode, and increase the duty cycle because the surrounding illumination is bright in a V-Mode, which is a city drive mode.

Example 6

Meanwhile, the visibility of the vehicle 10 may not be improved even though the brightness of the second lamp module 200 is increased when the surrounding illumination is increased by a certain level or more.

Figure 5:
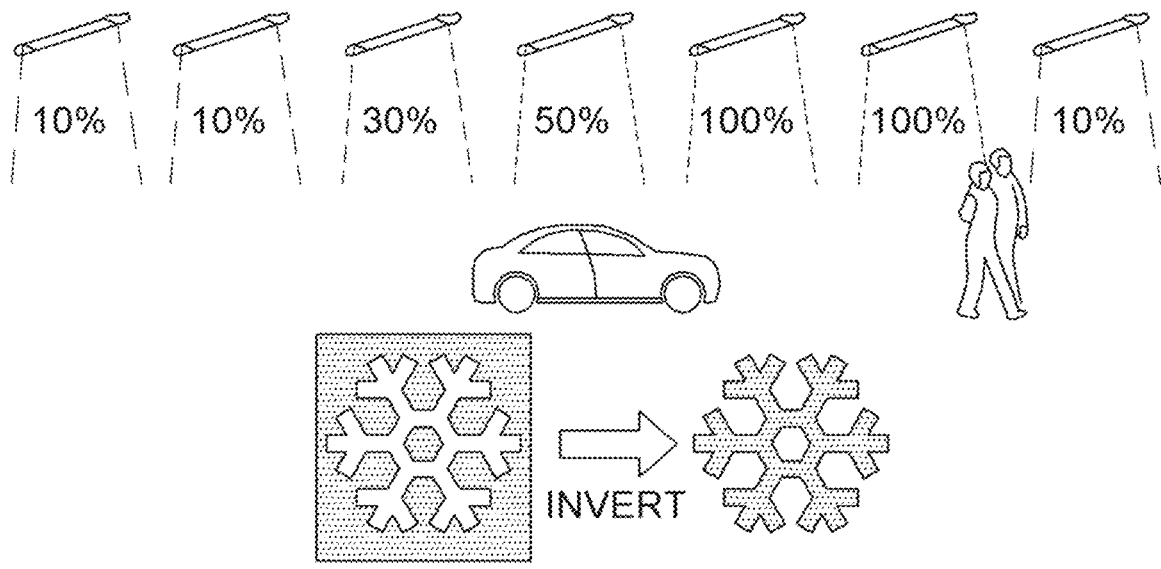
FIG. 5 is a schematic diagram showing Example 6 of the present disclosure.

FIG. 5 is a schematic diagram showing Example 6 of the present disclosure.

According to another embodiment of the present disclosure, the control unit 400 may receive the surrounding illumination information of the vehicle 10 from the illumination sensor, and control black and white images of the symbol output by the second lamp module 200 to be inverted and output as shown in FIG. 5 when the illumination information is the predetermined reference or more. In more detail, the control unit 400 may improve the visibility by processing a background to be in white and processing the symbol to be in black.

Example 7

Figure 6:
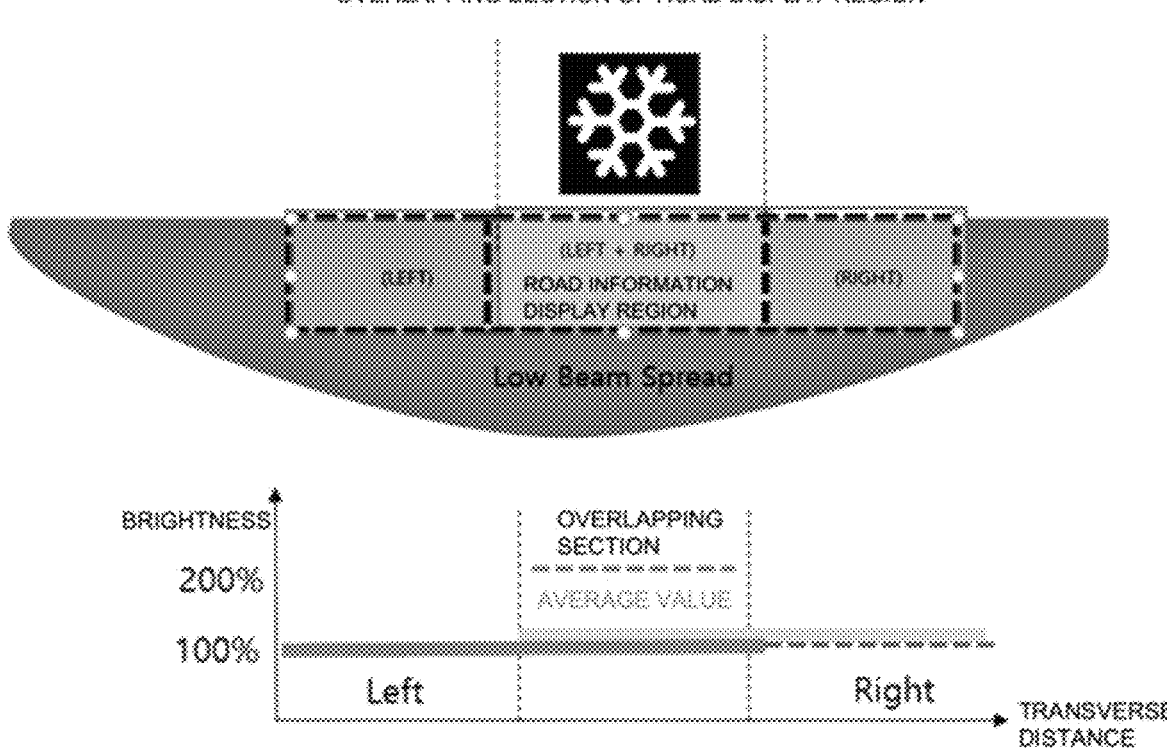
FIG. 6. includes schematic diagrams showing Example 7 of the present disclosure.

FIG. 6 includes schematic diagrams showing Example 7 of the present disclosure.

As shown in FIG. 6, according to another embodiment of the present disclosure, the control unit 400 may control the second lamp module 200 for light from the second lamp module 200 to be emitted to a region (or overlapping section of road display) where light emitted from the lamp systems 1000 positioned on the left and right sides of the vehicle 10 overlap each other when receiving the output of the sensor unit 300 to determine that the surrounding illumination of the vehicle 10 is to be increased. The overlapping region may be a region where the outputs of the left and right lamp systems 1000 are all emitted, and the brightness may be doubled compared to the surrounding region. Therefore, the visibility may be improved when the control unit 400 controls the symbol generated by the second lamp module 200 to be emitted to the overlapping region.

Example 8

Meanwhile, luminance of the second lamp module 200 may be lower as a temperature of the light source included in the second lamp module 200 is increased. Accordingly, the visibility of the symbol may be lower.

Figures 7A, 7B:
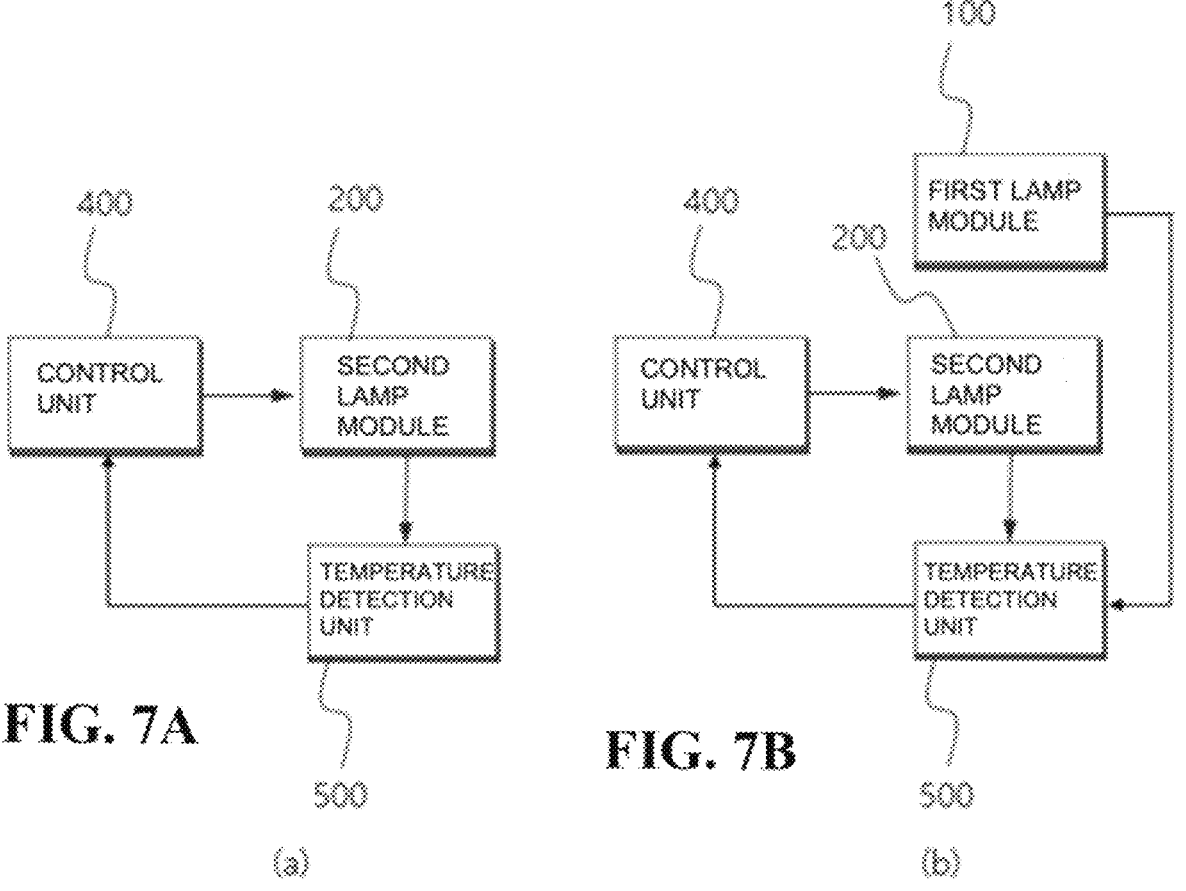
FIGS. 7A and 7B are block diagrams showing Example 8 of the present disclosure.

FIGS. 7A and 7B are block diagrams showing Example 8 of the present disclosure.

As shown in FIG. 7, according to another embodiment of the present disclosure, the lamp system 1000 may further include a temperature detection unit 500 detecting a temperature of at least one of the first lamp module 100 or the second lamp module 200. Accordingly, the control unit 400 may control the brightness of the second lamp module 200 to be increased at a predetermined temperature or more based on output of the temperature detection unit 500.

In more detail, as shown in FIG. 7A, the temperature detection unit 500 may detect only the temperature of the light source included in the second lamp module 200. Here, when the temperature of the light source is the predetermined temperature or more, the control unit 400 may improve the visibility by increasing the amount of current.

In addition, as shown in FIG. 7B, the temperature detection unit 500 may measure both the temperatures of the light sources in the first lamp module 100 and the second lamp module 200. Therefore, the control unit 400 may compare the temperature of the first lamp module 100 with the temperature of the second lamp module 200, and increase the amount of current to increase the brightness of the second lamp module 200 when the temperature of the second lamp module 200 is higher than the temperature of the first lamp module 100.

In addition, the control unit 400 may stop an operation of the lamp system 100 at a critical temperature or more to protect the light source.

In addition, a user may select whether the sensor unit 300 detects the surrounding environment and the control unit 400 automatically performs a process of adjusting the brightness of the second lamp module 200 through an internal system of the vehicle 10. When the control unit 400 automatically adjusts the brightness of the second lamp module 200, a maximum value may be set, and the brightness cannot be increased beyond the maximum value.

As set forth above, the lamp system with improved visibility in the various embodiments of the present disclosure may control the output of the lamp system based on the surrounding illumination, thereby minimizing the effect of the surrounding illumination to ensure its visibility.

Although the embodiments of the present disclosure are described as above, the embodiments disclosed in the present disclosure are provided not to limit the spirit of the present disclosure, but to fully describe the present disclosure. Therefore, the spirit of the present disclosure may include not only each disclosed embodiment, but also a combination of the disclosed embodiments. Further, the scope of the present disclosure is not limited by these embodiments. In addition, it is apparent to those skilled in the art to which the present disclosure pertains that various variations and modifications could be made without departing from the spirit and scope of the appended claims, and all such appropriate variations and modifications should be considered as falling within the scope of the present disclosure as equivalents.

What is claimed is:

1. A lamp system for a vehicle, the system comprising:
a first lamp module generating light, and outputting light to an outside of the vehicle in one direction;
a second lamp module generating light of a predetermined symbol, and outputting light to the outside of the vehicle to project the symbol;
a sensor unit including at least one of an advanced driver assistance system (ADAS) sensor or an illumination sensor to output external situation information; and
a control unit receiving the output of the sensor unit and controlling brightness of the second lamp module based on output of the sensor unit to promote visbility of the projected symbol;
wherein the control unit:
receives surrounding illumination information of the vehicle from the illumination sensor, and
controls black and white images of the symbol output by the second lamp module to be inverted based on the illumination information exceeding a predetermined reference.

2. The system of claim 1, wherein the control unit:
receives approach information of another vehicle from the ADAS sensor,
controls the brightness of the second lamp module to be increased based on the approach information of another vehicle when determining that another vehicle approaches the vehicle, and
controls the brightness of the second lamp module to be reduced after the other vehicle passes.

3. The system of claim 1, wherein the control unit:
receives, from a server, weather information of a region where the vehicle is positioned, and
controls the brightness of the second lamp module based on the received weather information.

4. The system of claim 1, wherein the control unit:
receives, from an external server, illumination information of a region where the vehicle is positioned, and
controls the brightness of the second lamp module to be increased when the received illumination information is equal to or greater than a predetermined reference.

5. The system of claim 1, wherein the control unit controls the brightness of the second lamp module by adjusting a duty cycle based on a drive mode of the vehicle.

6. The system of claim 5, wherein the control unit:
increases the duty cycle to be above a predetermined reference when the drive mode is a first mode,
lowers the duty cycle to be below the predetermined reference when the drive mode is a second mode, and
increases the duty cycle to be above the predetermined reference when the drive mode is a third mode.

7. The system of claim 1, further comprising a temperature detection unit detecting a temperature of at least one of the first lamp module and the second lamp module,
wherein the control unit controls brightness of the second lamp module to be increased at a predetermined temperature or greater based on output of the temperature detection unit.

8. The system of claim 7, wherein the temperature detection unit detects the temperatures of the first lamp module and the second lamp module, and
the control unit compares the temperature of the first lamp module with the temperature of the second lamp module, and controls brightness of the second lamp module to increase when the temperature of the second lamp module is higher than the temperature of the first lamp module.

9. A lamp system for a vehicle, the system comprising:
a first lamp module generating light, and outputting light to an outside of the vehicle in one direction;
a second lamp module generating light of a predetermined symbol, and outputting light to the outside of the vehicle to project the symbol;
a sensor unit including at least one of an advanced driver assistance system (ADAS) sensor or an illumination sensor to output external situation information; and
a control unit receiving the output of the sensor unit and controlling brightness of the second lamp module based on output of the sensor unit to promote visiblity of the projected symbol
wherein:
the control unit receives front image information of the vehicle from the ADAS sensor,
calculates a comparison value for brightness of each pixel based on the image information, and
controls the brightness of the second lamp module to be increased when the comparison value is reduced by at least a predetermined reference.

10. The system of claim 9, wherein the control unit:
assigns a larger number to a pixel having greater illumination, and
calculates the comparison value by selecting two pixels having a largest contrast with each other among all between the pixels.

11. A lamp system for a vehicle, the system comprising:
a first lamp module generating light, and outputting light to the outside of the vehicle in one direction;
a second lamp module generating light of a predetermined symbol, and outputting light to an outside of the vehicle to project the symbol;
a sensor unit including at least one of an advanced driver assistance system (ADAS) sensor or an illumination sensor to output external situation information; and
a control unit receiving the output of the sensor unit and controlling brightness of the second lamp module based on output of the sensor unit to promote visiblity of the projected symbol;
wherein the control unit controls the second lamp module to cause light from the second lamp module to be emitted to a region where light emitted from lamp systems positioned on left and right sides of the vehicle overlap each other when receiving the output of the sensor unit to determine that surrounding illumination of the vehicle is to be increased.

* * * * *